United States Patent Office 3,522,410
Patented Aug. 4, 1970

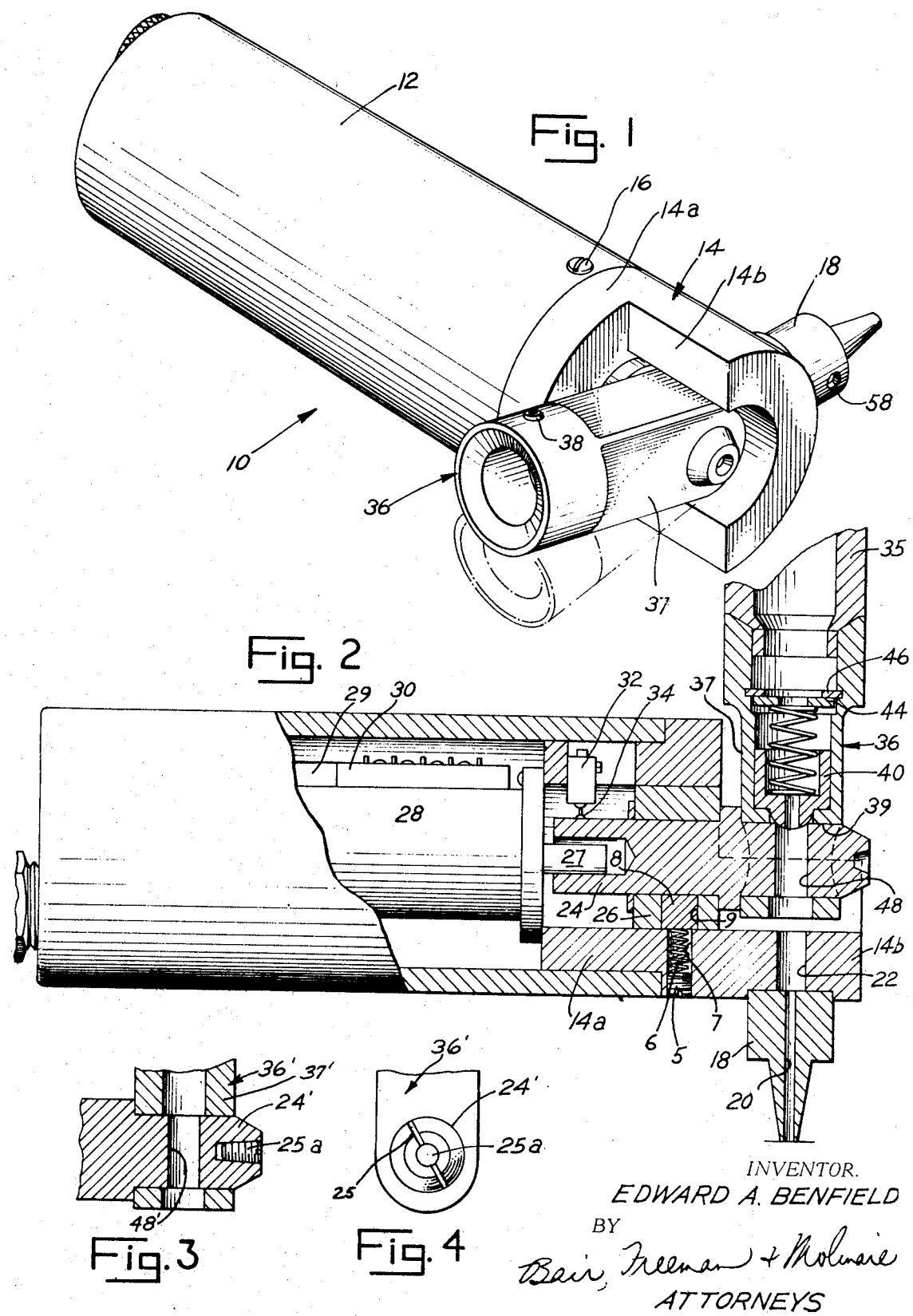

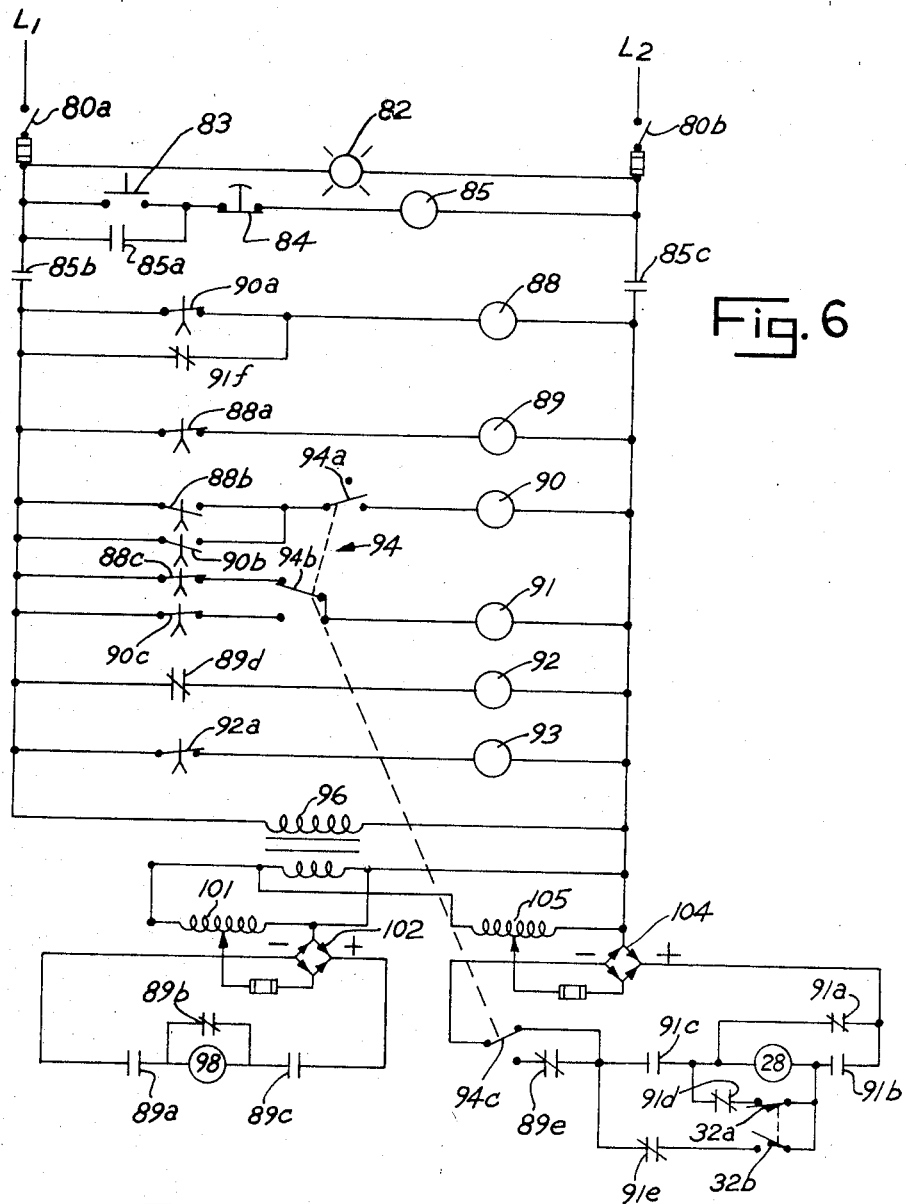
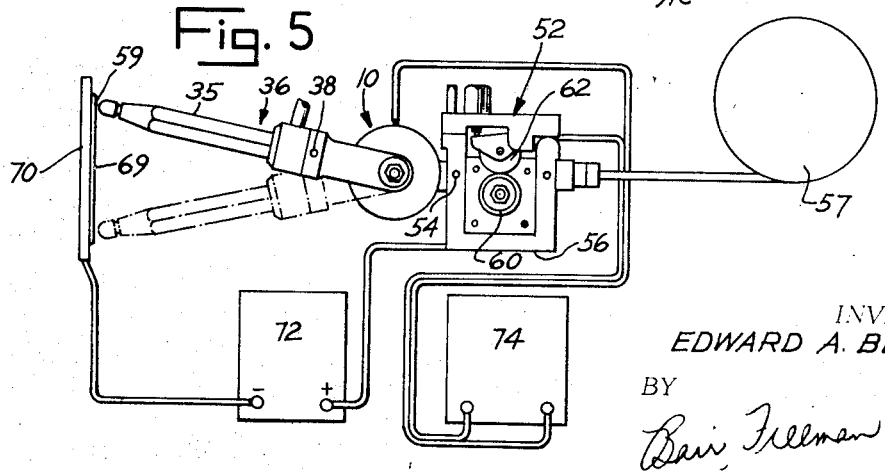

3,522,410
WELDING APPARATUS
Edward A. Benfield, Chicago, Ill., assignor to Compak-O-Matic, a corporation of Illinois
Filed Feb. 28, 1968, Ser. No. 708,877
Int. Cl. B23k 9/12
U.S. Cl. 219—125    8 Claims

ABSTRACT OF THE DISCLOSURE

Welding apparatus comprising a compact attachment for welding a short seam. The attachment is retained on a welding head by a single set screw, hence, it is readily attached and removed from the welding head. The attachment includes barrel means rotatable through a short arc for effecting the seam weld on a workpiece, with the barrel means being releasably carried on its drive shaft to prevent damage to the shaft or barrel means in the event the barrel means strikes an obstruction in use and to facilitate removal of the barrel means from the shaft for repair or replacement.

BACKGROUND OF THE INVENTION

This invention relates to welding apparatus and, more particularly, to a short seam attachment for a welding unit.

Heretofore, one method of welding a short seam, for example, up to 4 or 5 inches, has been to reciprocably mount a welding unit on a trackway and move it by means of an air cylinder or the like of the desired distance while making the weld. When the weld was completed, the air cylinder returned the welding unit to a starting position. Such equipment was cumbersome and not well suited to production line welding or automation fixtures.

More recently, it has been proposed that the barrel of a welding unit be oscillated back and forth to effect welding of a short seam. The oscillator was cumbersome and complicated with many parts and required attachment to the welding unit separate from the barrel. Further, the barrel was connected rigidly to a drive shaft for driving same, and if the barrel struck an obstruction the barrel would be damaged.

An object of the present invention is to provide a novel short seam welding mechanism for a welding unit, wherein the disadvantages and deficiencies of prior constructions are overcome.

Another object of the present invention is to provide a novel short seam welding mechanism that is simple and reliable, and readily attached and removed from a welding unit by a single fastener.

Yet another object of the present invention is to provide an improved welding mechanism including a barrel operatively and releasably joined to a drive shaft such that the barrel is normally rotated by said shaft, but in the event the barrel strikes an obstruction, the barrel may be released from fixed engagement with the shaft, so that it can move relative thereto and prevent damage to the barrel or to the shaft. Other objects and advantages of the present invention will be made more apparent hereafter.

BRIEF DESCRIPTION OF THE DRAWING

FIG. 1 is a perspective view of the short seam welding mechanism embodying principles of the present invention;

FIG. 2 is a partial cross-sectional view of the short seam welding mechanism of FIG. 1;

FIG. 3 is a detail cross-sectional view similar to FIG. 2 of a modified embodiment of short seam welding mechanism illustrating an alternative connection of the barrel actuator means to the shaft.

FIG. 4 is an end view of the barrel actuator means and shaft taken generally along line 4—4 of FIG. 3;

FIG. 5 is an illustration of welding apparatus including the short seam welding mechanism joined to a welding unit; and FIG. 6 is a schematic wiring diagram of a circuit including the short seam welding mechanism.

DESCRIPTION OF THE PREFERRED EMBODIMENT

Referring to FIGS. 1 and 2, there is shown the short seam welding mechanism of the present invention. The mechanism 10 comprises a tubular housing 12 having an end block 14 secured at one end thereof in a suitable manner, as, for example, by fastening screw 16. The end block 14 is defined in part by a tubular portion 14a secured to the housing 12 and a hemispherical annular ring-like portion 14b. Secured to the portion 14b of the end block 14 is a wire inlet block or fitting 18 which has an opening 20 extending therethrough. The opening 20 is in alignment with and communicates with an opening 22 in the end block 14 for permitting feeding of wire from a reel, through a welding unit, and through openings 20 and 22 to a machine barrel as will be more fully set forth hereafter.

A drive shaft 24 is journaled in bearing 26 within the end block 14. The rotative force for the drive shaft 24 is provided by the drive motor 28 housed within the motor housing 12 and operatively connected to the drive shaft 24 by motor shaft 27. Secured to the housing of the drive motor 28 is a terminal strip 30 for permitting connection of the drive motor 28 into an electric control circuit. If desired, a reversing switch 29 may be provided so that the initial direction of drive of motor 28 may be changed as desired. Also included in the electric control circuit is a limit switch 32, which is secured to the end block 14 in position to be engaged by actuator 34 on the exterior surface of drive shaft 24. Alternatively, the actuator may be a recess or flattened portion on the exterior surface of drive shaft 24. The switch 32 would function in the same manner in the control circuit as will be more fully described hereafter.

A feature of the invention is the yieldable connection of the barrel actuator means 36 to the drive shaft 24. The barrel actuator means 36 includes a collar portion 37, which receives the barrel 35. The barrel 35 is secured to the collar portion 37, as, for example, by means of a set screw 38. The collar portion 37 includes an opening 39 transverse to the axis thereof, which is complementary in cross-section to the exterior to the shaft 24 and closely engages the exterior of the shaft 24. Provided in the collar portion 37 is a plunger 40, which is adapted to be biased toward the shaft 24 by spring 42. The spring at one end abuts the plunger 40 and at the other end the spring abuts washer 44 that is secured in place within the collar portion 37 by retaining ring 46. The plunger 40 has a rounded end which is adapted to engage in one end of the diametric opening 48 extending through the drive shaft 24, so as to operatively connect the barrel actuator means 36 to the drive shaft 24 for rotation therewith. In the event the barrel 35 supported within the collar portion 37 were to strike an obstruction, the rounded end portion of the plunger 40 would yield with respect to the opening, so as to permit the collar portion 37 to move relative to the drive shaft 24 and thereby prevent damage to the barrel actuator means 36, to the drive shaft 24 or to the drive shaft motor 28. To commence operation after removing the obstruction, it is only necessary to move the actuator means 36 relative to the drive shaft 24 as to engage the rounded end of the plunger 40 in an end of the opening 48 in the drive shaft 24.

The barrel actuator means 36 may be easily removed from the drive shaft 24 by urging the barrel actuator means at right angles to the drive shaft 24. The plunger 40 will yield against the spring 42 and permit the sliding of the barrel actuator means from the drive shaft 24. The cutaway portion of the block 14 and the free open end of the end block 14 permit the ready removal and replacement of a barrel actuator means 36 on drive shaft 24.

The end block 14 is provided with a threaded hole 7, that is perpendicular to the longitudinal axis of the end block. Hole 7 is in alignment with a bearing pad 8 in a hole 9 in bearing 26. Spring 6 disposed in hole 7 biases the bearing pad 8, which may be made from metal, such as brass, or a suitable plastic, against shaft 24 to control backlash in the internal gearing of drive motor 28. The spring 6 is retained in place within hole or opening 7 by set screw 5.

FIGS. 3 and 4 illustrate a modified arrangement for yieldably securing the barrel actuator means to the drive shaft. For convenience, like elements are designated with primed reference numerals. The shaft 24' is provided with a diametrical longitudinally-extending slot 25 adjacent the end thereof. A tapered screw 25a is threaded into tapered axial opening in the end of the shaft 24' to spread the exterior surface at the end of shaft 24' into snug engagement with the barrel actuator collar portion 37' for retaining the barrel actuator means 36' in rotational engagement with the shaft. The barrel actuator means 36' is capable of moving on the shaft 24' in the event an obstruction is encountered during swinging movement of the barrel. The barrel actuator means 36' is readily removed from the shaft 24' upon outward rotation of tapered screw 25a from the axial opening in the end of the shaft 24'.

Referring now to FIG. 5, there is shown a system embodying the short seam welding mechanism of the present invention. The short seam welding mechanism 10 is secured to the welding unit 52 by means of a single set screw 54, which extends through an opening in the wall of the housing 56 of the welding unit 52 and engages with a recess 58 (FIG. 1) in the inlet block 18 of the short seam welding mechanism 10. To provide for 360° positioning of the short seam welding mechanism 10 in relation to the welding unit, an annular groove may be provided in the fitting 18 in place of the recess 58. The exterior of the inlet block 18 is complementary to the opening in the side wall of the housing 56 of the welding unit 52, so as to be fixedly secured therein. Disposed adjacent one end of the welding unit is a suitable reel 57 for supplying the consumable wire electrode 59 to the welding unit. The welding unit includes a drive roll 60 and an idler 62 cooperating therewith for moving the consumable wire electrode through the welding unit and short seam welding mechanism to the point of use. When the wire strikes the work, an arc will be established.

The machine barrel 35 is suitably secured to the collar portion 37 of the barrel actuator means 36, as, for example, by a set screw 38. The barrel 35 is adapted to be moved from the solid line position shown in FIG. 5 to the dotted line position in order to make the weld 69 on the work piece 70. The detail of the machine barrel is not part of the present invention and reference may be made for example, to U.S. Pat. 3,286,073 assigned to the assignee of the present case for further detail of the barrel construction.

The system of FIG. 5 includes a welding power source 72 electrically connected to the work piece 70 and to the welding unit 52. Also provided in the system is a suitable control panel 74 containing the control circuit for controlling operation of the welding unit 52 and the short seamer welding mechanism 10.

Referring now to FIG. 6, there is shown an electrical schematic diagram of the welding arrangement of FIG. 5. Current is supplied to the control circuit from a suitable source of power, for example, a 115-volt alternating current supply. Contacts 80a and 80b of a control switch control the flow of current from the source to the circuit. When contacts 80a and 80b are closed, pilot light 82 is lit. The circuit includes a start pushbutton 83, a stop reset pushbutton 84 and a relay 85 in series with the pushbuttons. Energization of relay 85 will actuate normally open contacts 85a, 85b and 85c. Included in the circuit are relays 88–93 and their associated contacts. Switch 94 comprised of contacts 94a and 94b in the main control circuit controls selection of short seam operation or alternative dual spot operation as will be made more apparent hereafter. The switch also includes a contact 94c in the short seamer motor circuit.

Transformer 96 reduces the voltage to the control circuits for the short seamer motor 28 in housing 12 and for the wire drive motor 98, which is housed in the welding unit housing 56. The control circuit for the wire drive motor 98 includes auto transformer 101, rectifier means 102 for converting A.C. current to D.C. current and relay contacts 89a, 89b and 89c. The control circuit for the short seamer drive motor 28 includes auto transformer 105 and rectifier means 104 for converting the A.C. current to D.C. current. Also in the short seamer drive motor circuit are selection switch contacts 94c, limit switch contacts 32a and 32b, and relay contacts 89e, 91a, 91c, 91d and 91e.

As indicated above, the welding apparatus may be used for seam welding and alternatively can be used for dual spot welding. The sequence of operation will first be described for seam welding and then for dual spot welding. For seam welding, power supply switch contacts 80a and 80b are closed. The operator closes pushbutton 83 energizing relays 85, 88, 89, 91 and 93. Energization of relay 85, closes contacts 85a, 85b and 85c. When relay 89 is energized, contacts 89a and 89c are closed to energize wire drive motor 98 and feed wire. The wire 59 strikes the work and an arc is established.

With energization of relay 91, contacts 91b and 91c are closed energizing short seamer drive motor 28. Motor 28 will drive shaft 24 to rotate the barrel actuator means 36, and the barrel 35 carried therewith moves across the work to weld the seam. As drive shaft 24 rotates, limit switch contact 32a is opened and limit switch contact 32b is closed.

The relay 88 controls a time cycle and when the contact 88a thereof is opened, relay 89 is de-energized. When relay 89 is de-energized, contacts 89a and 89c open stopping the feed of wire 59 and terminating the weld. At the same time, with the closing of contact 89d, relay 92 is energized to start a timing cycle. When relay 92 times out, contact 92a opens and the weld contacter relay 93 is de-energized. The short seamer drive motor 28 reverses the direction of travel and the machine barrel 35 is driven by the drive shaft 24 back to the starting point. The reversed circuit for drive motor 28 is from the negative side of the rectifier means 104 through switch 94c, through contact 91e, contact 32b, motor 28 and contact 91a to the positive side of the rectifier means 104. The reverse travel continues until the actuator cam 34 on the drive shaft opens switch contact 32b and closes switch contact 32a. The motor 28 is of the permanent magnet type and when the armature is shorted out, the motor is braked to a stop. The operator then presses the pushbutton 84 to reset the control circuit for the next cycle of operation.

For dual spot welding, the selector switch 94 is actuated such that the contact 94a is closed and the contact 94b is moved into engagement with the lower contact point. Contact 94c is moved from engagement with the upper contact point to the lower contact point. With contacts 80a and 80b closed, the operator initiates operation of the dual spot sequence by pushing start pushbutton 83. Relays 85, 88, 89, 91 and 93 are energized. Energization of relay 89 closes contacts 89a and 89c to energize wire drive motor 98 and feed wire 59 from the reel 58 to the work piece 70. When the wire electrode 59 strikes the work, an arc is established.

The spot weld continues for the time cycle setting of relay 88. When relay 88 completes its time cycle, contact 88a opens, contact 88b closes and contact 88c opens. Opening of contact 88a de-energizes relay 89. Contacts 89a and 89c are opening, stopping the wire drive motor 98 and welding terminates. With closing of contact 88b, relay 90 is actuated. Contact 90b closes to provide a holding circuit for relay 90.

With de-energization of relay 89, contact 89d is closed and relay 92 is energized, starting a time cycle. At end of the time cycle, contact 92a opens, de-energizing weld contactor relay 93. Upon de-energization of relay 89, contact 89c in the seamer motor circuit is closed. The motor is energized through contacts 94c (said contact arm being in engagement with the lower contact point) 89e, 91c and 91b. The shaft 24 is driven to move the barrel 35 across the work. The travel distance between spots is determined by the timing cycle of relay 90. When relay 90 completes its timing cycle, contacts 90a and 90c open and contact 90b closes, thus de-energizing relay 91. Relay 88 is energized through normally closed contact 91f to start its time cycle. Relay 89 is energized through contact 88a, thereby closing contacts 89a and 89c and energizing the wire feed drive motor 98. At the same time, dual spot timer relay 92 is reset and the weld contactor relay 93 is energized. The contact 89e in seamer motor circuit is open, preventing energization of the seamer drive motor 28.

The welding sequence is repeated, that is, motor 98 is energized, the wire strikes the work and an arc is established. The weld continues for the time cycle setting of relay 88. When the time cycle is completed, contact 88a opens and relay 89 is de-energized, stopping wire feed drive motor 98 and terminating welding. Dual spot timer relay 92 is energized to start its time cycle, at the end of which time cycle contact 92a opens to de-energize relay 93. The weld at the second spot is completed.

With the de-energization of relay 91, contact 91f closes, completing a circuit to relay 88, locking the timing circuit of relay 88. The short seamer motor 28 is energized with the closing of contact 89e and reverses its direction of rotation. The circuit is from the negative side of the rectifier means 104 through contacts 94c, 89e, 91e, 32b, motor 28 and contact 91a to the positive side of the rectifier means. The machine barrel 35 is returned to its starting position. The reverse travel continues until actuator cam 34 on the shaft 24 opens switch 32b and closes switch 32a, thereby de-energizing and braking the armature of the permanent magnet type short seamer drive motor 28. When the sequence ends, the operator presses reset pushbutton 84 to reset the control for the next operating sequence.

There has been provided by the present invention improved welding apparatus, including a short seam welding mechanism which is compact, reliable and readily mounted on and removed from a welding unit by a single fastener. The barrel actuator means of the seam welding mechanism is yieldably mounted on the drive shaft therefor to prevent damage to the components in the event the barrel were to strike an obstruction during movement thereof in operation. The control circuit for the welding apparatus incorporating the seam welding mechanism provides for positive controlled operation of the seamer drive motor both in normal seam weld operation and also, if desired, for spot weld operation.

While I have shown a presently preferred form of the invention, it will be understood that the invention is not limited thereto, since it may be otherwise embodied within the scope of the following claims.

What is claimed is:

1. For use with a welding unit having a housing with an opening in a wall thereof, said housing being adapted to be secured to a source of consumable wire, a short seamer mechanism comprising a casing adapted to be secured to said housing, said casing having an inlet block secured thereto and projecting therefrom, said inlet block having an exterior configuration complementary to that of said opening in said housing and having a bore therethrough for receiving consumable wire from said housing, said inlet block being secured to said housing by a single fastening means to permit rapid connection and removal of the short seamer mechanism from the housing. Said short seamer mechanism including a shaft rotatably carried within said casing, an opening in said shaft adapted to be aligned with the bore in said inlet block for permitting passage of consumable wire therethrough, barrel actuator means yieldably affixed to the shaft and including means defining opening means in alignment with the opening in said shaft for permitting passage of consumable wire into said barrel actuator means.

2. A device as in claim 1 wherein said single fastening means comprises a set screw extending through a hole in said housing into engagement with the inlet block.

3. A device as in claim 1, wherein the barrel actuator means includes a collar portion having a transverse opening complementary in cross-section to the shaft and being disposed on the shaft, spring-loaded detent means in the barrel actuator means for engaging in one end of said opening in the shaft for releasably securing the collar portion of the barrel actuator means to the shaft, whereby the barrel actuator means can yield with respect to the shaft in the event movement of the barrel actuator means is obstructed in use, and whereby the barrel actuator means can be readily removed from the shaft for repair or replacement without removal of the short seamer mechanism from the welding unit.

4. A device as in claim 3, wherein the spring loaded detent means includes a plunger movable in the collar portion toward and away from engagement with an end of the opening in the shaft, and spring means in the collar portion biasing the plunger toward the shaft and into engagement with an end of the opening in the shaft.

5. A device as in claim 1, wherein the shaft has elongated longitudinal slots extending from an end of the shaft, an axial opening in the shaft extending inwardly from said end, and a tapered pin in said axial opening for spreading the shaft end and thereby securing the barrel actuator means to the shaft for rotation therewith, the exterior of the shaft being complementary to the interior of transverse opening means in the barrel actuator means and the abutting surfaces being smooth, so as to permit relative movement between the barrel actuator means and the shaft if the barrel actuator means struck an obstruction during movement thereof.

6. A short seamer welding mechanism adapted to be secured to a welding unit; said welding mechanism comprising a casing, a drive motor within said casing, a power shaft driven by said drive motor, barrel means carried on said shaft and driven thereby, and control means for actuating the drive motor so as to selectively rotate the barrel means between first and second predetermined positions, said barrel means including a collar portion having a circular opening and a barrel joined to the collar portion, a portion of the power shaft having a circular exterior complementary to the said circular opening, said collar portion being releasably connected to said portion of the power shaft, whereby during normal operation, the barrel means and power shaft move together, but in the event the barrel encounters an obstruction in use, the collar portion can move relative to the power shaft and prevent damage to the components of the welding mechanism.

7. A short seamer mechanism as in claim 1 wherein means are provided for minimizing backlash of the shaft, such means comprising a spring biased bearing pad in the casing bearing directly against the shaft.

8. A short seamer welding mechanism adapted to be secured to a welding unit, said welding mechanism comprising a casing, a wire inlet block on said casing with a passage for receiving consumable wire, a drive motor within said casing, a rotatable power shaft driven by said drive motor, said power shaft having a transverse passage therethrough barrel means carried on said power shaft and rotatably driven thereby, said barrel means having a longitudinal passage therethrough aligned with said transverse passage for receiving consumable wire from the wire inlet block and directing same to the end of the barrel means remote from the connection of the barrel means to the power shaft, and control means for actuating the drive motor so as to rotate the barrel means about the axis of the power shaft between first and second predetermined positions along the line of weld to make a continuous weld or alternately to make spot welds.

References Cited

UNITED STATES PATENTS

| | | | |
|---|---|---|---|
| 3,230,341 | 1/1966 | Blackburn | 219—125 |
| 1,580,020 | 4/1926 | Cutler et al. | 219—125 |
| 1,697,046 | 1/1926 | Chapman et al. | |
| 1,715,172 | 5/1929 | Ollerenshaw | 310—36 |
| 3,135,881 | 6/1964 | Frésard | 310—36 |
| 1,956,406 | 4/1934 | Vars | 219—125 |
| 3,128,368 | 4/1964 | Franz et al. | 219—125 |

JOSEPH V. TRUHE, Primary Examiner

L. A. SCHUTZMAN, Assistant Examiner

U.S. Cl. X.R.

219—130